US005945034A

United States Patent [19]
Handa et al.

[11] Patent Number: 5,945,034
[45] Date of Patent: Aug. 31, 1999

[54] ORGANIC POSITIVE TEMPERATURE COEFFICIENT THERMISTOR

[75] Inventors: Tokuhiko Handa; Yukie Yoshinari, both of Chiba, Japan

[73] Assignee: TDK Corporation, Tokyo, Japan

[21] Appl. No.: 09/204,241

[22] Filed: Dec. 3, 1998

[30] Foreign Application Priority Data

Dec. 4, 1997 [JP] Japan ..................... 9-350108

[51] Int. Cl.$^6$ ............... H01B 1/00; H01B 1/20; H01B 1/22; H01B 1/24
[52] U.S. Cl. ............ 252/511; 252/510; 252/512; 252/513; 252/518.1; 219/541; 219/546; 219/547; 219/553; 264/104; 264/105; 264/234; 264/347
[58] Field of Search ............ 252/500, 510–513, 252/518, 519

[56] References Cited

U.S. PATENT DOCUMENTS 5,378,407  1/1995  Chandler et al. ............ 252/513

FOREIGN PATENT DOCUMENTS 5-47503  2/1993  Japan .

*Primary Examiner*—Yogendra Gupta
*Assistant Examiner*—Derrick G Hamlin
*Attorney, Agent, or Firm*—Oblon, Spivak, McClelland, Maier & Neustadt, P.C.

[57] ABSTRACT

An organic positive temperature coefficient thermistor comprises a thermoplastic polymer matrix, a low-molecular organic compound, and conductive particles, each having spiky protuberances thereon. The low-molecular organic compound has a melting point of 40° C. to 100° C. The conductive particles are interconnected in a chain form.

3 Claims, 4 Drawing Sheets

ORGANIC POSITIVE TEMPERATURE COEFFICIENT THERMISTOR

BACKGROUND OF THE INVENTION

The present invention relates to an organic positive temperature coefficient thermistor that is used as a temperature sensor or overcurrent-protecting element, and has PTC (positive temperature coefficient of resistivity) characteristics that its resistance value increases with increasing temperature.

An organic positive temperature coefficient thermistor having conductive particles dispersed in a crystalline polymer has been well known in the art, as typically disclosed in U.S. Pat. Nos. 3,243,753 and 3,351,882. The increase in the resistance value is believed to be due to the expansion of the crystalline polymer upon melting, which in turn cleaves a current-carrying path defined by the conductive fine particles.

An organic positive temperature coefficient thermistor can be used as a self regulating heater, an overcurrent-protecting element, and a temperature sensor. Requirements for these are that the resistance value is low at room temperature in a non-operating state, the rate of change between the room-temperature resistance value and the resistance value in operation is sufficiently large, and the resistance value change upon repetitive operations is reduced. In applications such as temperature sensors, the temperature vs. resistance curve hysteresis should be reduced.

To meet such requirements, it has been proposed to incorporate a low-molecular organic compound such as wax in a polymer matrix. Such an organic positive temperature coefficient thermistor, for instance, includes a polyisobutylene/paraffin wax/carbon black system (F. Bueche, J. Appl. Phys., 44, 532, 1973), a styrene-butadiene rubber/paraffin wax/carbon black system (F. Bueche, J. Polymer Sci., 11, 1319, 1973), and a low-density polyethylene/paraffin wax/carbon black system (K. Ohe et al., Jpn. J. Appl. Phys., 10, 99, 1971). Self regulating heaters, current-limiting elements, etc. comprising an organic positive temperature coefficient thermistor using a low-molecular organic compound are also disclosed in JP-B's 62-16523, 7-109786 and 7-48396, and JP-A's 62-51184, 62-51185, 62-51186, 62-51187, 1-231284, 3-132001, 9-27383 and 9-69410. In these cases, the increase in the resistance is believed to be due to the melting of the low-molecular organic compound.

One of advantages to the use of the low-molecular organic compound is that there is a sharp rise in the resistance increase with increasing temperature because the low-molecular organic compound is generally higher in crystallinity than a polymer. A polymer, because of being easily put into an over-cooled state, shows a hysteresis where the temperature at which there is a resistance decrease with decreasing temperature is usually lower than the temperature at which there is a resistance increase with increasing temperature. With the low-molecular organic compound it is then possible to keep this hysteresis small. By use of low-molecular organic compounds having different melting points, it is possible to easily control the temperature (operating temperature) at which there is a resistance increase. A polymer is susceptible to a melting point change depending on a difference in molecular weight and crystallinity, and its copolymerization with a comonomer, resulting in a variation in the crystal state. In this case, no sufficient PTC characteristics are often obtained. This is particularly true of the case where the operating temperature is set at 100° C. or lower.

One of the above publications, Jpn. J. Appl. Phys., 10, 99, 1971 shows an example wherein the specific resistance value ($\Omega$-cm) increases by a factor of $10^8$. However, the specific resistance value at room temperature is as high as $10^4$ $\Omega$-cm, and so is impractical for an overcurrent-protecting element or temperature sensor in particular. Other publications show resistance value ($\Omega$) or specific resistance ($\Omega$-cm) increases in the range between 10 times or lower and $10^4$ times, with the room-temperature resistance being not sufficiently low.

In many cases, carbon black has been used as conductive particles in prior art organic positive temperature coefficient thermistors including the above-mentioned ones. A problem with carbon black is, however, that when an increased amount of carbon black is used to lower the initial resistance value, no sufficient rate of resistance change is obtainable. Sometimes, particles of generally available metals are used as conductive particles. In this case, too, it is difficult to arrive at a sensible tradeoff between low initial resistance and a large rate of resistance change.

One approach to solving this problem is disclosed in JP-A 5-47503 that teaches the use of conductive particles having spiky protuberances. More specifically, it is disclosed that polyvinylidene fluoride is used as a crystalline polymer and spiky nickel powders are used as conductive particles having spiky protuberances. U.S. Pat. No. 5,378,407, too, discloses a thermistor comprising filamentary nickel having spiky protuberances, and a polyolefin, olefinic copolymer or fluoropolymer.

However, these thermistors are still insufficient in terms of hysteresis and so are unsuitable for applications such as temperature sensors, although the effect on the tradeoff between low initial resistance and a large resistance change is improved.

One object of the present invention is to provide an organic positive temperature coefficient thermistor that shows a reduced temperature vs. resistance curve hysteresis, makes control of operating temperature easy, and has both sufficiently low room-temperature resistance and a large rate of resistance change between an operating state and a non-operating state. Another object of the invention is to provide an organic positive temperature coefficient thermistor that does not only meet such requirements but can also be operated at 100° C. or lower.

SUMMARY OF THE INVENTION

Such objects are achieved by the inventions defined below as (1) to (3).

(1) An organic positive temperature coefficient thermistor comprising a thermoplastic polymer matrix, a low-molecular organic compound, and conductive particles, each having spiky protuberances thereon.

(2) The organic positive temperature coefficient thermistor according to (1), wherein said low-molecular organic compound has a melting point of 40° C. to 100° C.

(3) The organic positive temperature coefficient thermistor according to (1) or (2), wherein said conductive particles, each having spiky protuberances, are interconnected in a chain form.

In the present invention, the spiky shape of protuberances on the conductive particles enables a tunnel current to pass readily through the thermistor, and makes it possible to obtain initial resistance lower than would be possible with spherical conductive particles. When the thermistor is in operation, a large resistance value is obtainable because spaces between the spiky conductive particles are larger than those between spherical conductive particles.

In the present invention, the low-molecular organic compound is molten to achieve the PTC (positive temperature coefficient of resistivity) characteristics that the resistance value increases with increasing temperature, so that the temperature vs. resistance curve hysteresis can be more reduced than that obtained by use of the polymer matrix alone. Control of operating temperature by use of low-molecular organic compounds having varying melting points, etc. is easier than control of operating temperature making use of a change in the melting point of a polymer.

In this regard, it is noted that JP-A 5-47503 discloses an organic positive temperature coefficient thermistor characterized by comprising a crystalline polymer, and conductive particles milled with said crystalline polymer, each of said conductive particles having spiky protuberances. U.S. Pat. No. 5,378,407 discloses a conductive polymer composition comprising filamentary nickel having spiky protuberances, and a polyolefin, olefinic copolymer or fluoropolymer. However, these publications are silent about the use of the low-molecular organic compound, unlike the present invention.

BRIEF DESCRIPTION OF THE DRAWINGS

The above and other objects, features, and advantages of the present invention will be better understood from the following description taken in conjunction with the accompanying drawings.

DETAILED DESCRIPTION OF THE INVENTION

The present invention will now be explained in more detail.

The organic positive temperature coefficient thermistor of the invention comprises a thermoplastic polymer matrix, a low-molecular organic compound, and conductive particles, each having spiky protuberances. Preferably, the conductive particles having spiky protuberances are milled with the thermoplastic polymer matrix with which the low-molecular organic compound is mixed.

The polymer matrix used may be either crystalline or amorphous with the proviso that it is of thermoplasticity. To prevent fluidization and deformation of the polymer matrix due to the melting of the low-molecular organic compound during operation, however, it is desired that the melting or softening point of the polymer matrix be higher than the melting point of the low-molecular organic compound, preferably by at least 30° C., and more preferably by 30° C. to 110° C. inclusive. It is then desired that the melting or softening point of the thermoplastic polymer matrix be usually 70 to 200° C.

Preferably but not exclusively, the low-molecular organic compound used is a crystalline yet solid (at normal temperature or about 25° C.) substance having a molecular weight of up to about 1,000.

Such a low-molecular organic compound, for instance, includes waxes (e.g., petroleum waxes such as paraffin wax and microcrystalline wax as well as natural waxes such as vegetable waxes, animal waxes and mineral waxes), and fats and oils (e.g., fats, and those called solid fats). Components of the waxes, and fats and oils may be selected from hydrocarbons (e.g., an alkane type straight-chain hydrocarbon having 22 or more carbon atoms), fatty acids (e.g., a fatty acid of an alkane type straight-chain hydrocarbon having 22 or more carbon atoms), fatty esters (e.g., a methyl ester of a saturated fatty acid obtained from a saturated fatty acid having 20 or more carbon atoms and a lower alcohol such as methyl alcohol), fatty amides (e.g., a primary amide of a saturated fatty acid having 10 or less carbon atoms, and an unsaturated fatty amide such as oleic amide, and erucic amide), aliphatic amines (e.g., an aliphatic primary amine having 16 or more carbon atoms), and higher alcohols (e.g., an n-alkyl alcohol having 16 or more carbon atoms). However, these components may be used by themselves as the low-molecular organic compound.

These low-molecular organic compounds are commercially available, and commercial products may be immediately used alone or in combination of two or more.

In the present invention, one object is to provide a thermistor that can be operated preferably at 100° C. or lower, using the low-molecular organic compound having preferably a melting point, mp, of 40 to 100° C. Such a low-molecular organic compound, for instance, includes paraffin waxes (e.g., tetracosane $C_{24}H_{50}$ mp 49–52° C.; hexatriacontane $C_{36}H_{74}$ mp 73° C.; HNP-10 (trade name) mp 75° C., Nippon Seiro Co., Ltd.; and HNP-3 mp 66° C., Nippon Seiro Co., Ltd.), microcrystalline waxes (e.g., Hi-Mic-1080 (trade name) mp 83° C., Nippon Seiro Co., Ltd.; Hi-Mic-1045 mp 70° C., Nippon Seiro Co., Ltd.; Hi-Mic-2045 mp 64° C., Nippon Seiro Co., Ltd.; Hi-Mic-3090 mp 89° C., Nippon Seiro Co., Ltd.; Seratta 104 mp 96° C., Nippon Sekiyu Seisei Co., Ltd.; and 155 Microwax mp 70° C., Nippon Sekiyu Seisei Co., Ltd.), fatty acids (e.g., behenic acid mp 81° C., Nippon Seika Co., Ltd.; stearic acid mp 72° C., Nippon Seika Co., Ltd.; and palmitic acid mp 64° C., Nippon Seika Co., Ltd.), fatty esters (arachic methyl ester mp 48° C., Tokyo Kasei Co., Ltd.), and fatty amides (e.g., oleic amide mp 76° C., Nippon Seika Co., Ltd.). Use may also be made of wax blends which comprise paraffin waxes and resins and may further contain microcrystalline waxes, and which have a melting point of 40 to 100° C.

The low-molecular organic compounds may be used alone or in combination of two or more although depending on operating temperature and so on.

The thermoplastic polymer matrix used herein, for instance, includes:

i) polyolefin (e.g., polyethylene);

ii) copolymer composed of monomer units derived from one or two or more olefins (e.g., ethylene, and propylene) and an olefinic unsaturated monomer having one or two or more polar groups (e.g., an ethylene-vinyl acetate copolymer), polymethyl (meth)acrylates, and EVA;

iii) halogenated vinyl and vinylidene polymers (e.g., polyvinyl chloride, polyvinylidene chloride, polyvinyl fluoride, and polyvinylidene fluoride);

iv) polyamide (e.g., 12-nylon);

v) polystyrene;
vi) polyacrylonitrile;
vii) thermoplastic elastomer;
viii) polyethylene oxide, and polyacetal;
ix) thermoplastic modified cellulose;
x) polysulfones; and More specific reference is made to high-density polyethylene (e.g., Hizex 2100JP, Mitsui Petrochemical Industries, Ltd., and Marlex 6003, Phillips Petroleum Co.), low-density polyethylene (e.g., LC500, Nippon Polychem Co., Ltd., and DYNH-1, Union Carbide Corp.), medium-density polyethylene (2604M, Gulf Oil Corp. ), ethylene-ethyl acrylate copolymer (e.g., DPD 6169, Union Carbide Corp.), ethylene-acrylic acid copolymer (EAA 455, Dow Chemical Co.), hexafluoroethylene-tetrafluoroethylene copolymer (e.g., FEP 100, Du Pont), and polyvinylidene fluoride (e.g., Kynar 461, Penvalt). It is preferable that such thermoplastic polymers have preferably a molecular weight of about 10,000 to 5,000,000 as expressed by weight-average molecular weight, a melting or softening point of 70 to 200° C. as already mentioned, and a melt flow rate of 0.1 to 30 g/10 minutes as defined by ASTM D1238.

These thermoplastic polymers may be used alone or in combination of two or more. Although it is preferable that the polymer matrix is composed only of such a thermoplastic resin as mentioned above (which resin may be crosslinked), it is understood that the polymer matrix may optionally contain elastomers or thermosetting resins or their mixture.

The conductive particles used herein, each having spiky protuberances, are each made up of a primary particle having pointed protuberances. More specifically, a number of (usually 10 to 500) conical and spiky protuberances, each having a height of ⅓ to ⅟₅₀ of particle diameter, are present on one single particle. The conductive particles are preferably made up of nickel or the like.

Although such conductive particles may be used in a discrete powder form, it is preferable that they are used in a chain form of about 10 to 1,000 interconnected primary particles. The chain form of interconnected primary particles may partially include primary particles. Examples of the former include a spherical form of nickel powders having spiky protuberances, one of which is commercially available under the trade name of INCO Type 123 Nickel Powder (INCO Co., Ltd.). These powders have an average particle diameter of about 3 to 7 μm, an apparent density of about 1.8 to 2.7 g/cm³, and a specific surface area of about 0.34 to 0.44 m²/g.

Preferred examples of the latter are filamentary nickel powders, some of which are commercially available under the trade names of INCO Type 255 Nickel Powder, INCO Type 270 Nickel Powder, INCO Type 287 Nickel Powder, and INCO Type 210 Nickel Powder, all made by INCO Co., Ltd., with the former three being preferred. The primary particles have an average particle diameter of preferably at least 0.1 μm, and more preferably from about 0.5 to about 4.0 μm inclusive. Primary particles having an average particle diameter of 1.0 to 4.0 μm inclusive are most preferred, and may be mixed with 50% by weight or less of primary particles having an average particle diameter of 0.1 μm to less than 1.0 μm. The apparent density is about 0.3 to 1.0 g/cm³ and the specific surface area is about 0.4 to 2.5 m²/g.

In this regard, it is noted that the average particle diameter is measured by the Fischer subsieve method.

Such conductive particles are set forth in JP-A 5-47503 and U.S. Pat. No. 5,378,407.

Referring to the mixing ratio between the thermoplastic polymer matrix and the low-molecular organic compound, it is preferable that the low-molecular organic compound is used at a ratio of 0.2 to 4 (by weight) per thermoplastic polymer. At such a weight ratio it is possible to take full advantage of the invention. When this ratio becomes low or the amount of the low-molecular organic compound becomes small, it is difficult to obtain any satisfactory rate of resistance change. When this ratio becomes high, on the contrary, the thermistor element is not only unacceptably deformed upon the melting of the low-molecular compound, but it is also difficult to mix the low-molecular compound with the conductive particles. If the amount of the conductive particles is 2 to 5 times as large as the total weight of the polymer matrix and low-molecular organic compound, it is then possible to take full advantage of the invention. When the amount of the conductive particles becomes small, it is impossible to make the room-temperature resistance in a non-operating state sufficiently low. When the amount of the conductive particles becomes large, on the contrary, it is not only difficult to obtain any large rate of resistance change, but it is also difficult to achieve any uniform mixing, resulting in a failure in obtaining any reproducible resistance value.

In the practice of the invention, milling should preferably be done at a temperature that is higher than the melting or softening point of the thermoplastic polymer matrix (especially the melting or softening point +5 to 40° C.). Milling may otherwise be done in known manners using, e.g., a mill for a period of about 5 to 90 minutes. Alternatively, the thermoplastic polymer and low-molecular organic compound may have been mixed together in advance in a molten state or dissolved in a solvent before mixing.

Antioxidants may optionally be used to prevent thermal degradation and oxidation of the polymer matrix and low-molecular organic compound. For instance, phenols, organic sulfur compounds, and phosphites may be used to this end.

A thermistor element may be obtained by pressing the obtained mixture in a sheet form having a given thickness, and then hot-pressing electrodes of metals such as copper, and nickel thereon. If required, the thermistor element may be subjected to a crosslinking treatment by means of radiation crosslinking, chemical crosslinking using an organic peroxide, and aqueous crosslinking due to the condensation reaction of a silanol group by the grafting of a silane coupling agent. The electrodes may be formed simultaneously with pressing.

The organic positive temperature coefficient thermistor according to the invention has low initial resistance in its non-operating state and a resistance value of about $10^{-3}$ to $10^{-1}$ Ωcm as measured at room temperature, with a sharp resistance rise upon operation and the rate of resistance change upon transition from its non-operating state to operating state being at least 8 orders of magnitude greater. While no accurate upper limit to the rate of resistance change can be found because of measuring device constraints, it is estimated to reach at least 11 orders of magnitude. In addition, the temperature vs. resistance curve hysteresis is reduced.

The present invention will now be explained more specifically with reference to examples, and comparative examples.

EXAMPLE 1

Low-density polyethylene (LC 500 made by Nippon Polychem Co., Ltd. with a melt flow rate of 4.0 g/10 minutes, a density of 0.918 g/cm³ and a melting point of 106° C.) was used as the polymer matrix, paraffin wax (HNP-10 made by Nippon Seiro Co., Ltd. with a melting point of 75° C.) as the low-molecular organic compound, and filamentary nickel powders (Type 255 Nickel Powder made by INCO Co., Ltd.) as the conductive particles. The conductive particles had an average particle diameter of 2.2 to 2.8 µm, an apparent density of 0.5 to 0.65 g/cm³, and a specific surface area of 0.68 m²/g.

Figure 1:
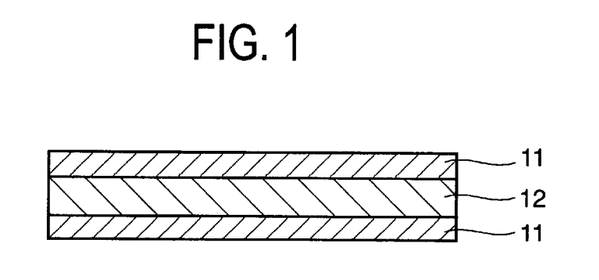
FIG. 1 is a sectional schematic of one embodiment of the organic positive coefficient thermistor according to the invention.

The low-density polyethylene was previously mixed with 50% by weight of the wax in a molten state. This polyethylene/wax mixture was milled in a mill at 115° C. for 10 minutes with the addition thereto of the nickel powders in a weight of 4 times as large as the mixture and dicumyl oxide as an organic peroxide in an amount of 3% by weight of the mixture. Nickel foils of 30 µm in thickness were placed on and pressed at 110° C. against both sides of the resulting mixture, using a heat pressing machine. In this way, a pressed assembly of 1 mm in total thickness was obtained. This assembly was punched out into a disk shape of 10 mm in diameter, and then heat treated at 155° C. for 50 minutes for the purpose of chemical crosslinking, thereby obtaining a thermistor element. The structure of this thermistor element is shown in FIG. 1. As can be seen from FIG. 1, the thermistor element is made up of a pressed thermistor element sheet 12 comprising the low-molecular organic compound, polymer matrix and conductive particles, and sandwiched between nickel foil electrodes 11.

Figure 2:
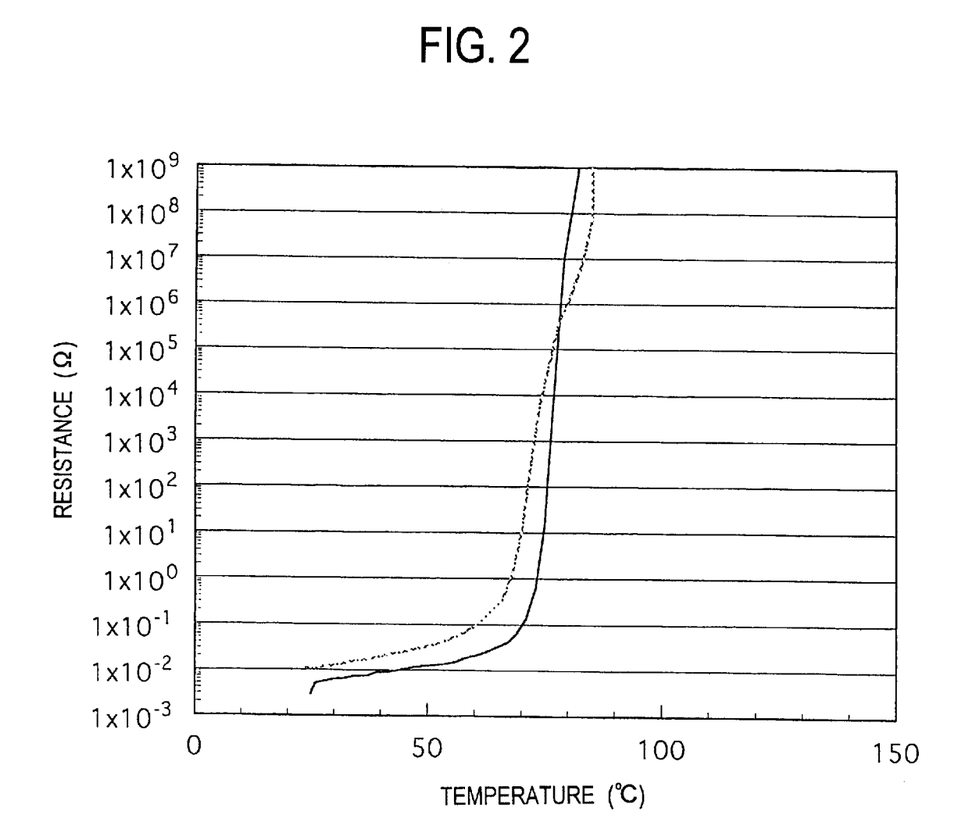
FIG. 2 is a temperature vs. resistance curve for the thermistor element according to Example 1.

This element was heated and cooled in a thermostat to measure its resistance value at predetermined temperatures by a four-terminal method, thereby obtaining a temperature vs. resistance curve as shown in FIG. 2, with solid and broken lines representing the rates of resistance change during the rise and fall of temperature, respectively. The room-temperature resistance (at 25° C.) was $3\times10^{-3}$ Ω, and the resistance value showed a sharp rise at the melting point of the wax, 75° C., with a maximum resistance value of at least $10^9$ Ω and a rate of resistance change of at least 11 orders of magnitude. It is also found that the heating/cooling cycle hysteresis frequently observed in operation using the melting point of a crystalline polymer such as polyethylene, and polyvinylidene fluoride is considerably reduced.

The degree of hysteresis, i.e., an index to this hysteresis was found in the following manner.

Degree Of Hysteresis

Figure 3:
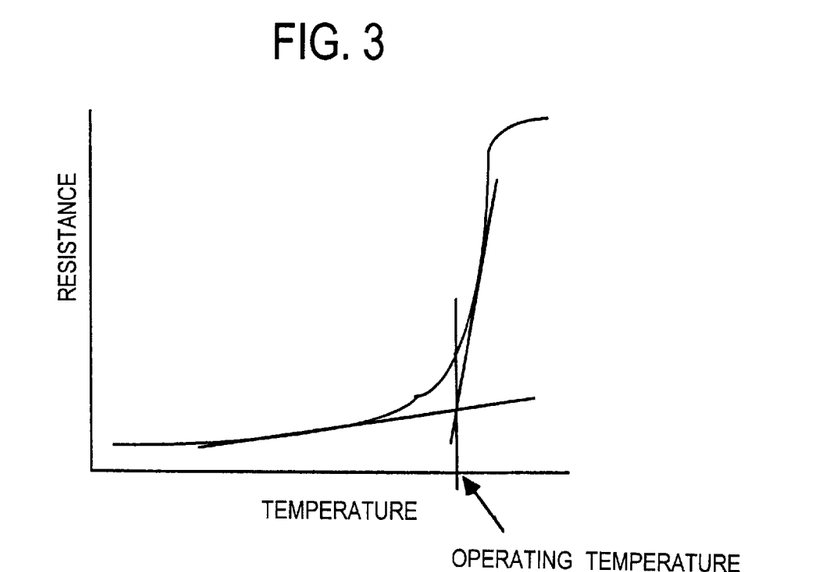
FIG. 3 is a graphical view for illustrating how to find the operating temperature, thereby determining the degree of hysteresis from a temperature vs. resistance curve.

A typical temperature vs. resistance curve showing a resistance change during the rise of temperature is shown in FIG. 3. On this graph, straight lines are drawn tangent to curve segments, before and after operation, of the temperature vs. resistance curve. An operating temperature is then given by a point of intersection of these lines. Likewise, an operating temperature is found from a temperature vs. resistance curve obtained during the fall of temperature. The degree of hysteresis is defined by a difference (absolute value) between both the operating temperatures. The smaller the value, the more reduced the hysteresis is.

The thus found degree of hysteresis was 4° C. for the inventive element using paraffin wax, and about 15° C. to 25° C. for elements composed only of the aforesaid crystalline polymers. It is thus understood that the inventive element shows considerably reduced hysteresis.

EXAMPLE 2

Figure 4:
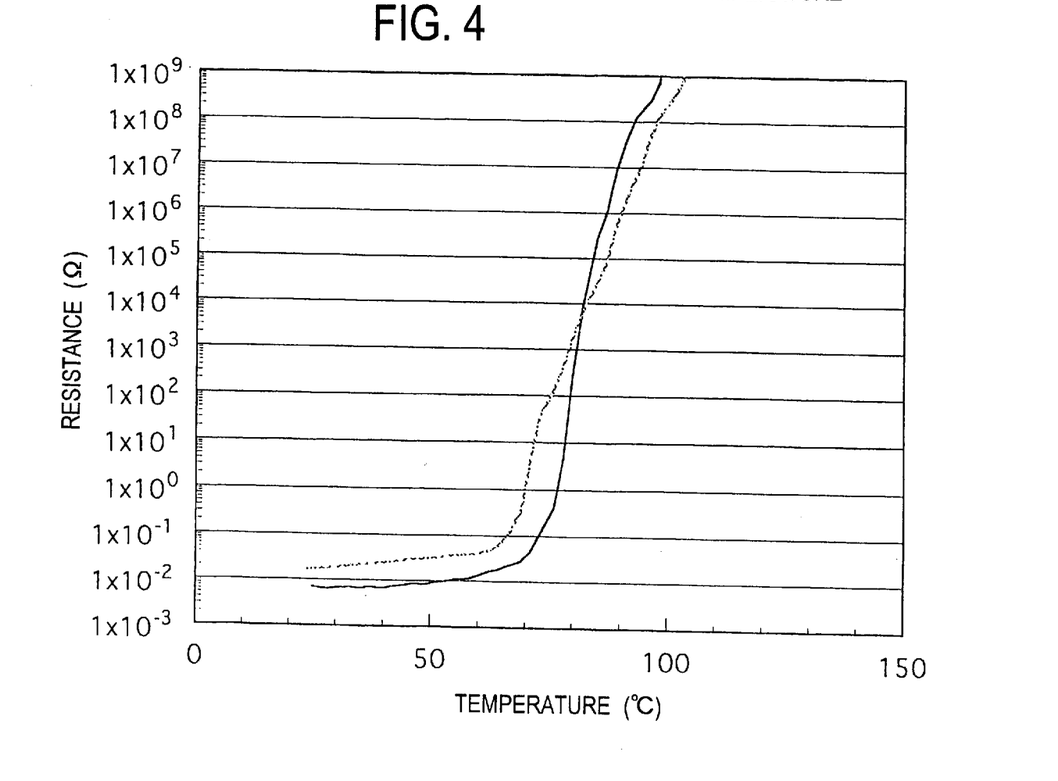
FIG. 4 is a temperature vs. resistance curve for the thermistor element according to Example 2.

A thermistor element was obtained and estimated following Example 1 with the exception that high-density polyethylene (Hizex 2100JP made by Mitsui Petrochemical Industries, Ltd. with a melt flow rate of 6.0 g/10 minutes, a density of 0.956 g/cm³ and a melting point of 127° C.) was used as the polymer matrix and mixed with the wax in the same amount (weight), and milling was done at 140° C. The temperature vs. resistance curve is shown in FIG. 4. The room-temperature initial resistance value was $6\times10^{-3}$ Ω, and the resistance value showed a sharp rise at the melting point of the wax, 75° C., with a post-operation maximum resistance value of at least $10^9$ Ω and a rate of resistance change being of at least 11 orders of magnitude. From FIG. 4, it is also understood that the resistance hysteresis is considerably reduced. In this regard, the degree of hysteresis was 7° C.

EXAMPLE 3

Figure 5:
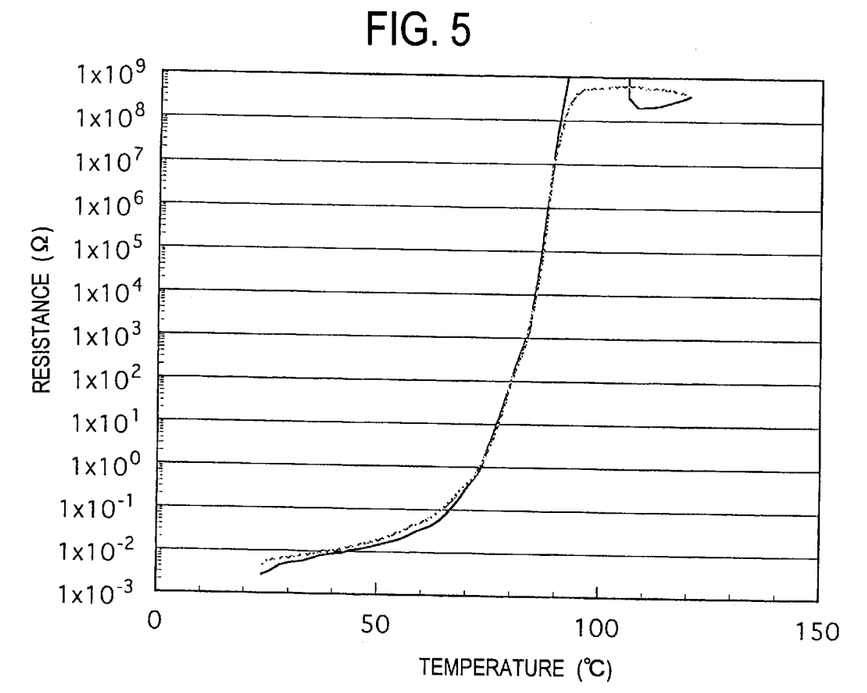
FIG. 5 is a temperature vs. resistance curve for the thermistor element according to Example 3.

A thermistor element was obtained and estimated following Example 1 with the exception that microcrystalline wax (Hi-Mic-1080 made by Nippon Seiro Co., Ltd. with a melting point of 83° C.) was used as the low-molecular organic compound. The temperature vs. resistance curve is shown in FIG. 5. The room-temperature initial resistance value was $3\times10^{-3}$ Ω, the post-operation maximum resistance value was at least $10^9$ Ω, and the rate of resistance change was of at least 11 orders of magnitude. From FIG. 5, it is also understood that the resistance hysteresis is considerably reduced. In this regard, the degree of hysteresis was 2° C.

EXAMPLE 4

Figure 6:
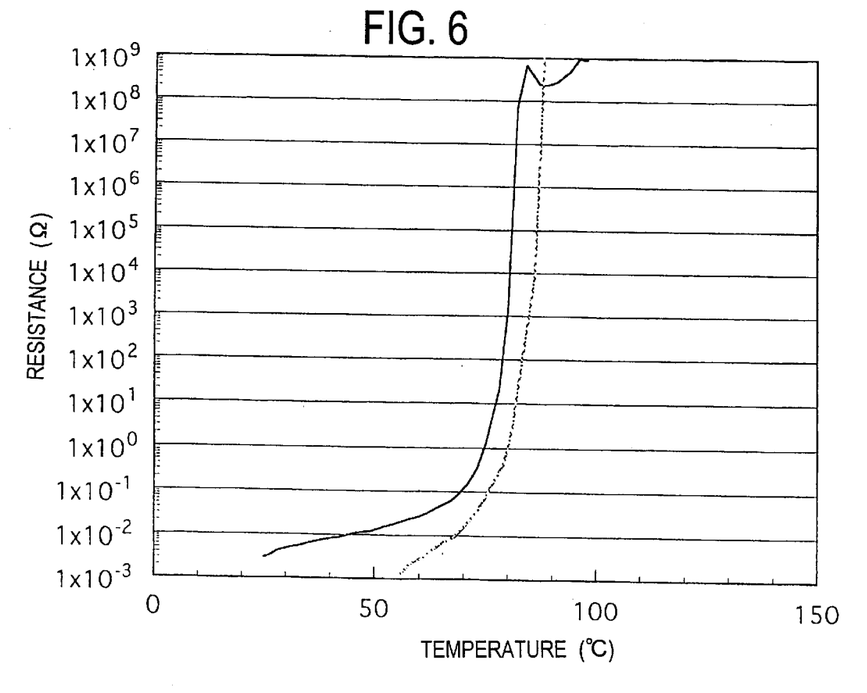
FIG. 6 is a temperature vs. resistance curve for the thermistor element according to Example 4.

A thermistor element was obtained and estimated following Example 1 with the exception that behenic acid (made by Nippon Seika Co., Ltd. with a melting point of 81° C.) was used as the low-molecular organic compound and employed in an amount of 66% with respect to the low-density polyethylene. The temperature vs. resistance curve is shown in FIG. 6. The room-temperature initial resistance value was $3\times10^{-3}$ Ω, the post-operation maximum resistance value was at least $10^9$ Ω, and the rate of resistance change was again of at least 11 orders of magnitude. From FIG. 6, it is also understood that the resistance hysteresis is considerably reduced. In this regard, the degree of hysteresis was 3° C.

COMPARATIVE EXAMPLE 1

Figure 7:
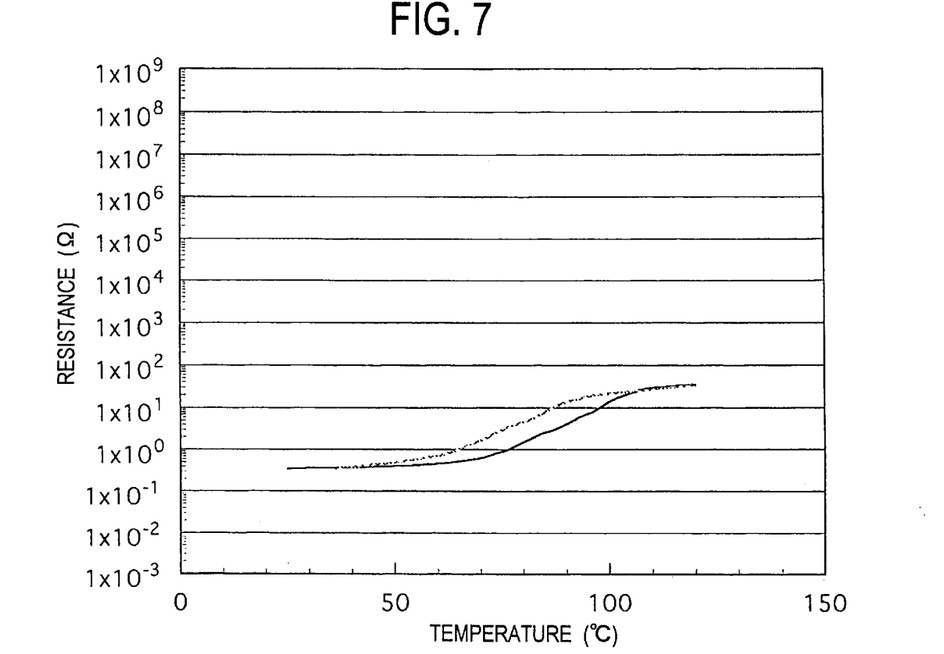
FIG. 7 is a temperature vs. resistance curve for the thermistor element according to Comparative Example 1.

A thermistor element was obtained and estimated following Example 1 with the exception that carbon black (Toka Carbon Black #4500 made by Tokai Carbon Co., Ltd. with an average particle size of 60 nm and a specific surface area of 66 m²/g) was used as the conductive particles and the carbon black was milled in an amount of 66% by weight with respect to a mixture of the low-density polyethylene and paraffin wax. The temperature vs. resistance curve is shown in FIG. 7. The room-temperature resistance value was $2\times10^{-1}$ Ω, the post-operation maximum resistance value was 10 Ω, and the rate of resistance change was of 1.7 orders of magnitude. As can be understood from the facts that the room-temperature resistance value is higher than those of the thermistor elements according to Examples 1 to 4, and the rate of resistance change is at most 9 orders of magnitude based on the thermistor elements according to Examples 1 to 4, this comparative thermistor element is remarkably lacking in practicality. In this regard, the degree of hysteresis was 5° C.

When the amount of the carbon black used was increased to 100% by weight with respect to the mixture, there was a further reduction in the rate of resistance change, although the room-temperature resistance could be lowered. From this it is evident that the conductive particles having spiky protuberances are effective in the practice of the invention.

COMPARATIVE EXAMPLE 2

Figure 8:
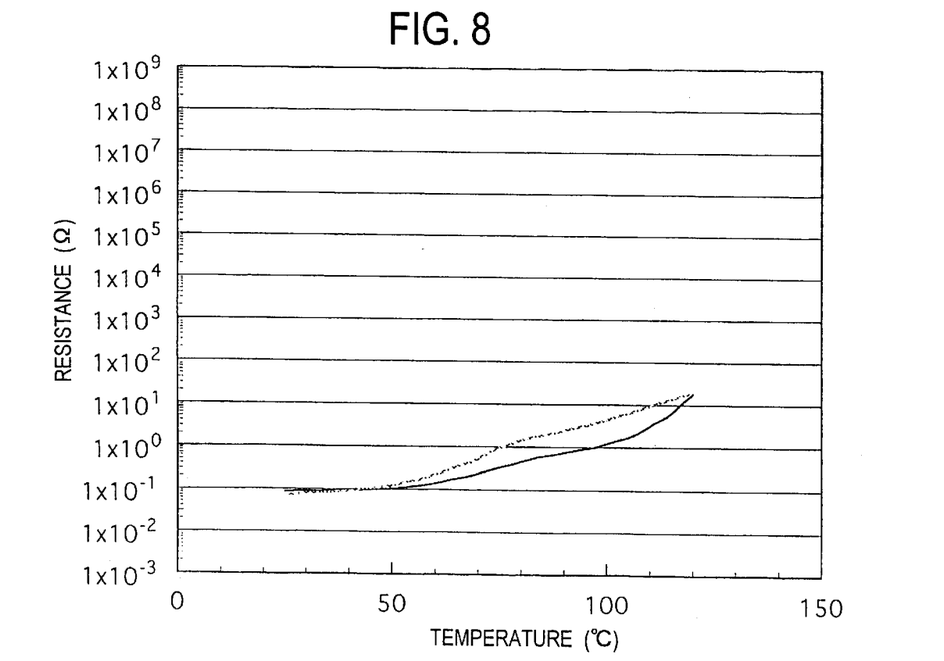
FIG. 8 is a temperature vs. resistance curve for the thermistor element according to Comparative Example 2.

A thermistor element was obtained and estimated following Example 1 with the exception that spherical nickel powders (Type 110 Nickel Powder made by INCO Co., Ltd. with an average particle size of 0.8 to 1.5 µm, an apparent density of 0.9 to 1.5 g/cm³ and a specific surface area of 0.9 to 2 m²/g) were used as the conductive particles. The temperature vs. resistance curve is shown in FIG. 8. The room-temperature resistance value was $9\times10^{-2}$ Ω, the post-operation maximum resistance value was 18.7 Ω, and the rate of resistance change was of 2.3 orders of magnitude. From this it is evident that the conductive particles having spiky protuberances are effective in the practice of the invention. In this regard, the degree of hysteresis was 5° C.

The room-temperature resistance values, maximum resistance values, rates of resistance change, and degrees of hysteresis obtained in Examples 1 to 4 and Comparative Examples 1 and 2 are enumerated in Table 1, in which the melting points, mp, of the low-molecular organic compounds used are also given.

TABLE 1

|  | Polymer Matrix | Low-Molecular Organic compound (mp) | Conductive Particles | RT Resistance (Ω) | Max. Resistance Value (Ω) | Rate of Resistance Change (orders of magnitude) | Degree of Hysteresis (°C.) |
| --- | --- | --- | --- | --- | --- | --- | --- |
| Ex. 1 | Low-density polyethylene | Paraffin wax (75° C.) | Filamentous Ni powders | $3 \times 10^{-3}$ | $10^9$ or greater | 11 or greater | 4 |
| 2 | High-Density polyethylene | Paraffin wax (75° C.) | Filamentous Ni powders | $6 \times 10^{-3}$ | $10^9$ or greater | 11 or greater | 7 |
| 3 | Low-density polyethylene | Microcrystalline wax (83° C.) | Filamentous Ni powders | $3 \times 10^{-3}$ | $10^9$ or greater | 11 or greater | 2 |
| 4 | Low-density polyethylene | Bhenic acid (81° C.) | Filamentous Ni powders | $3 \times 10^{-3}$ | $10^9$ or greater | 11 or greater | 3 |
| Comp. Ex. 1 | Low-density polyethylene | Paraffin wax (75° C.) | Carbon black | $2 \times 10^{-1}$ | 10 | 1.7 | 5 |
| 2 | Low-density polyethylene | Paraffin wax (75° C.) | Ni Spherical powders | $9 \times 10^{-2}$ | 18.7 | 2.3 | 5 |

RT Resistance: Room-temperature resistance

EXAMPLES 5 to 10

Thermistor elements were obtained and estimated as in Example 1 except that such combinations of polymer matrixes with low-molecular organic compounds as shown in Table 2 were used at such quantitative ratios as shown in Table 2. However, milling was done at a temperature higher than the melting or softening points by 5 to 30° C. The resultant thermistor elements were all found to be equivalent to the thermistor elements obtained in Examples 1 to 4 in terms of the room-temperature resistance value, maximum resistance value, rate of resistance change, and degree of hysteresis. In Table 2, the melt flow rates, MFRs, softening points, sp, and melting points, mp, of the matrices and the melting points, mp, of the low-molecular organic compounds are also given. Regarding 12-nylon, the molecular weight, Mw, is given in place of the melt flow rate.

TABLE 2

|  | Polymer Matrix | Low-Molecular Organic Compound | Matrix/Organic Compound Weight Ratio |
| --- | --- | --- | --- |
| Ex. 5 | High-density polyethylene (MFR 6.0 g/10 min., mp 127° C.) | Paraffin wax HNP-10 (mp 75° C.) Microcrystalline wax Hi-Mic-2045 (mp 64° C.) 1:2 by weight | 1/1 |
| 6 | High-density polyethylene (MFR 6.0 g/10 min., mp 127° C.) | Paraffin wax HNP-3 (mp 66° C.) Microcrystalline wax Hi-Mic-3090 (mp 89° C.) 1:2 by weight | 1/1 |
| 7 | 12-Nylon (Mw = 24,000, mp 178° C.) | Paraffin wax HNP-10 (mp 75° C.) | 2/3 |
| 8 | PMMA (MFR 2.3 g/10 min., sp 110° C.) | Palmitic acid (mp 64° C.) | 2/3 |
| 9 | Polyacetal (MFR 2.8 g/10 min., mp 175° C.) | Oleic amide (mp 76° C.) | 1/1 |
| 10 | EVA (MFR 1.5 g/10 min., mp 99° C.) | Arachic acid methyl ester (mp 48° C.) | 2/1 |

High-density polyethylene: Hizex 2100JP, Mitsui Petrochemical Industries, Ltd.
12-Nylon: Ube Industries, Ltd.
PMMA (polymethyl methacrylate): Mitsubishi Rayon Co., Ltd.
Polyacetal: Asahi Chemical Industry Co., Ltd.
EVA (ethylene-vinyl acetate copolymer): Nippon Polychem Co., Ltd.
Paraffin wax: HNP-3, HNP-10, Nippon Seiro Co., Ltd.
Microcrystalline wax: Hi-Mic-2045, Hi-Mic-3090, Nippon Seiro Co., Ltd.
Oleic amide, palmitic acid: Nippon Seika Co., Ltd.
Arachic acid methyl ester: Tokyo Kasei Co., Ltd.

In Examples 5 and 6 where two low-molecular organic compounds were used, a thermistor element comprising each of them was also prepared. As a result, it was found that the thermistor element comprising two low-molecular organic compounds has an operating temperature different from that comprising each of them. By using two low-molecular organic compounds, it is thus possible to control the operating temperatures.

According to the present invention, it is possible to obtain a positive temperature coefficient thermistor having low room-temperature resistance and showing a large resistance change upon operation. By use of a low-molecular organic compound it is possible to make the temperature vs. resistance curve hysteresis small. If low-molecular organic compounds with varying melting points are used, it is then easy to control the operating temperature. It is also possible to reduce the operating temperature to 100° C. or lower.

Japanese Patent Application No. 350108/1997 is herein incorporated by reference.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential purport thereof. Therefore, it is intended that the invention not be limited to the particular embodiment disclosed as the best mode contemplated for carrying out this invention, but that the invention will include all embodiments failing within the scope of the appended claims.

What we claims is:

1. An organic positive temperature coefficient thermistor comprising a thermoplastic polymer matrix, a low-molecular organic compound, and conductive particles having spiky protuberances thereon.

2. The organic positive temperature coefficient thermistor according to claim 1, wherein said low-molecular organic compound has a melting point of 40° C. to 100° C.

3. The organic positive temperature coefficient thermistor according to claim 1, wherein said conductive particles, each having spiky protuberances, are interconnected in a chain form.

* * * * *